Figure 1:
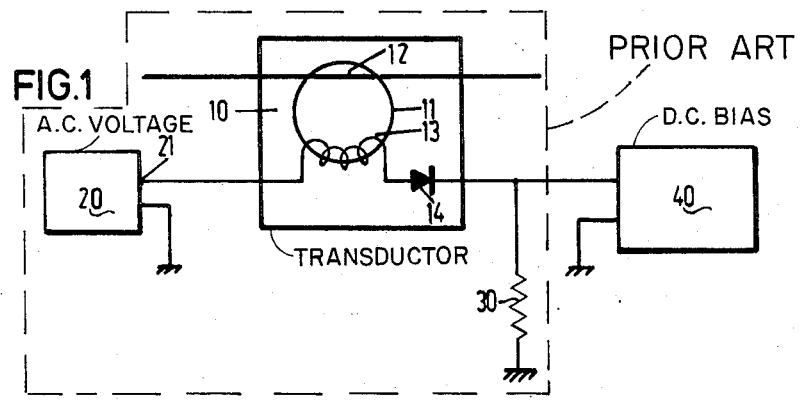

United States Patent [19]
Groenenbroom et al.

[11] 3,818,337

[45] June 18, 1974

[54] METHOD OF AND APPARATUS FOR IMPROVING THE LINEARITY OF THE CURRENT TRANSFORMATION OF A DC MEASURING TRANSDUCTOR

[75] Inventors: Maarten Groenenbroom, Escharen; Jacques Lisser, Nijmegen, both of Netherlands

[73] Assignee: Smit Nijmegan Electrotechnische Fabrieken N.V., Nijmegan, Netherlands

[22] Filed: June 13, 1972

[21] Appl. No.: 262,199

[30] Foreign Application Priority Data
June 17, 1971 Netherlands.................... 7108311

[52] U.S. Cl.............................. 324/127, 324/117
[51] Int. Cl.............................................. G01r 33/00
[58] Field of Search........................... 324/127, 117

[56] References Cited
UNITED STATES PATENTS 3,649,912  3/1972  Nakamura................... 324/117 X
3,699,442  10/1972  Riley............................ 324/117 X
3,708,749  1/1973  Bateman et al.................. 324/127

OTHER PUBLICATIONS

Kahen; IBM Tech. Discl. Bull., Vol. 12, No. 4, Sept. 1969, pp. 633-634.

*Primary Examiner*—Alfred E. Smith
*Attorney, Agent, or Firm*—Snyder, Brown and Ramik

[57] ABSTRACT

The linearity of the current transformation of a DC measuring transductor, having on a core of magnetisable material a primary winding carrying the DC to be measured and a secondary winding fed with an AC voltage, is improved by so controlling the AC voltage as to maintain the flux variation of the core at a constant value. The control is effected by means of a difference signal derived by comparison of a voltage constituting a measure of the flux variation with a constant reference voltage or by means of a signal representing the voltage loss occurring in a measuring circuit containing the secondary winding.

12 Claims, 3 Drawing Figures

PATENTED JUN 18 1974 3,818,337

INVENTOR

BY

ATTORNEY

METHOD OF AND APPARATUS FOR IMPROVING THE LINEARITY OF THE CURRENT TRANSFORMATION OF A DC MEASURING TRANSDUCTOR

BACKGROUND OF THE INVENTION

The invention relates to a method of and apparatus for improving the linearity of the current transformation of a DC measuring transductor having a primary winding for conducting the DC current to be measured and a second winding coupled thereto via a core of magnetisable material which is fed with an AC voltage.

DC measuring transductors of this kind for measuring very high direct currents are known, for example, from the article "Development of the DC Instrument Transformer for the Precision Measurement of Highest Direct Currents" by W. Krämer in I.E.E.E. Trans. No. 73 on Commun. Electronics, 1964 (pages 382–390).

As a result of the magnetising current and the stray field occuring, the current transformation of such measuring transductors departs from the ideal value so that the measuring accuracy is unfavourably influenced. In order to keep this deviation within limits acceptable for the desirable accuracy, it has already been proposed to use high-permeability material for the core and also to use an AC voltage so high that the dispersion error is negligible. When a high AC voltage is used, however, a higher power must be used and relatively large components are required. In addition, in the case of high AC voltages, the parasitic currents due to the coil capacitance of the transductor winding will have an appreciable influence on the measuring accuracy. These parasitic currents are highly dependent upon voltage, frequency and temperature. When a high AC voltage is used, a high voltage is also induced in the primary winding of the transductor, and this is preferably avoided.

SUMMARY OF THE INVENTION

The object of the invention is to provide such an improvement of the linearity of the current transformation of the DC measuring transductor that high measuring accuracy is obtained even when a relatively low AC voltage is used.

The invention is predicated upon the principle that the magnetising current is dependent upon the inductance variation occurring in the core, i.e., the number of volt seconds or flux induced in the secondary winding. This flux decreases in the event of an increase in the current through the winding, as a result of the voltage loss occurring therein and in the load resistor. A further flux variation occurs in the event of variations in the amplitude and the frequency of the AC voltage. The dispersion error is also proportional to the load current. To summarize, the total measuring error occurring as a result of the non-linearity of the current transformation is dependent upon the load current. If, as proposed by the invention, this error is rendered independent of the load current, it can be compensated, thus giving a better approximation of the ideal current transformation.

To this end, according to the invention, in a method of the above type, the AC voltage is so controlled that the flux variation of the transductor core remains of a constant value. According to a first embodiment, to this end, a voltage is derived which forms a measure of the flux variation occurring in the transductor core, this derived voltage is compared with a constant reference voltage, and the difference signal of the two compared voltages is used as a control value for controlling the AC voltage. In this connection it is important whether the AC voltage used has a varying or a constant frequency. In the latter case, the voltage which forms the measure of the occurring flux variation may be derived in a more simple manner. For such case also another embodiment is of some importance, according to which a voltage is derived which constitutes a measure of the voltage loss occurring, as a result of the current flowing through the secondary winding, in the circuit containing said winding, and said derived voltage is used as a control value for controlling the AC voltage.

The invention also provides a special system apparatus for application of the new method. As is conventional, the system comprises a measuring transductor having at least one primary winding through which the DC to be measured flows, and at least one secondary winding coupled thereto via a core of magnetisable material, said secondary winding being connected in a measuring circuit having at least one load impedance and a preferably stabilized AC voltage source. According to the invention, the system furthermore comprises a pick-up member to provide a signal which is a measure of the magnetic flux variation occurring in the transductor core, and a processing member which is coupled to the pick-up member and an output of which is connected to a control input of the controllable AC voltage source for such control thereof that the flux variation occurring in the transductor core is kept constant. A simple solution is obtained according to the invention if at least a part of the pick-up member is formed by at least a part of the secondary winding connected in the measuring circuit, or, in order to obtain even greater accuracy, by a separate secondary winding disposed on the transductor core. If the AC voltage used does not have a constant frequency, the invention also proposes that the pick-up member should comprise an integrator. At the output of such an integrator fed by a secondary winding, constituting together with the integrator the pick-up member, a voltage is obtained which forms an accurate measure of the number of volt seconds of the voltage induced in the transductor windings. When an AC voltage of substantially constant frequency is used, the integrator can be dispensed with and yet the same result is obtained by measuring the mean value.

According to the invention, the system furthermore is so constructed that an output of the pick-up member, for example the output of the integrator, is connected to one input of a comparator the other input of which is connected to a constant reference voltage source, the comparator output being connected to the AC voltage source control input. The resulting closed control loop has the effect that the number of volt seconds or the flux of the magnetic field, as determined by the reference voltage, is maintained within the measuring transductor windings.

As already stated, when an AC voltage of constant frequency is used, it is possible to use another embodiment of the method according to the invention, wherein only the total voltage loss occurring in the measuring circuit containing the secondary transductor winding is used to give a control magnitude for controlling the AC voltage source. To this end, the invention provides a system wherein the pick-up member for the signal forming a measure of the flux variations occurring is constituted by a resistor connected in the measuring circuit for deriving a voltage which forms a measure of the current flowing through the measuring circuit, said voltage being fed to a control input of a controllable reference voltage source, one output of which is connected to one input of a comparator, the other input of which is connected to the AC voltage source, the comparator output being connected to the AC voltage source control input.

Figure 2:
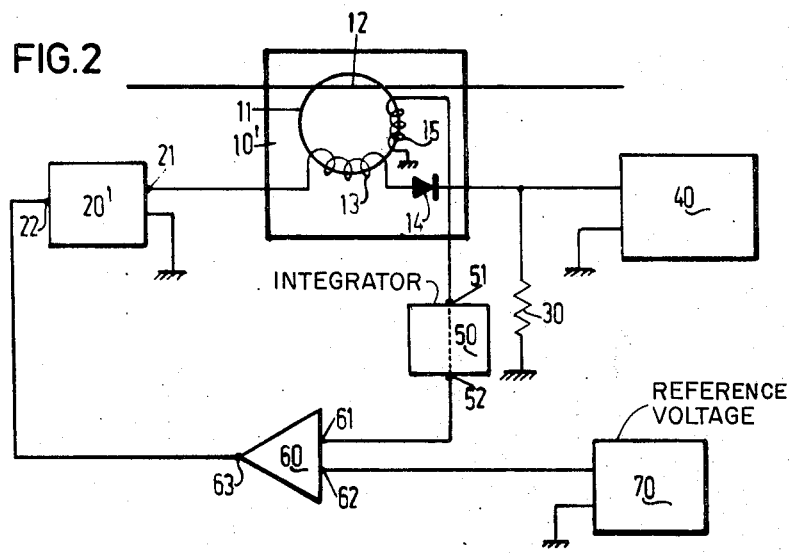
Figure 3:
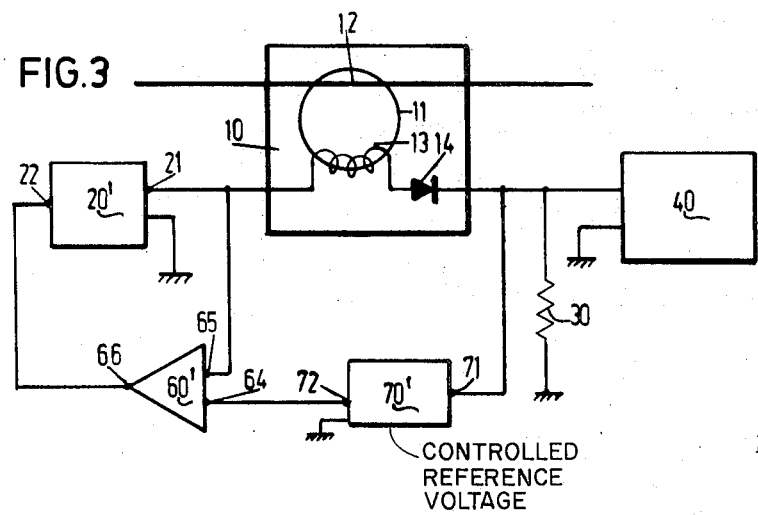

The invention will be explained in the following description with reference to the accompanying drawing wherein FIGS. 1, 2 and 3 are respectively block diagrams of a DC measuring system of the conventional kind and of two embodiments of the system according to the invention.

FIG. 1 illustrates the general arrangement according to the prior art, in somewhat simplified form for the sake of clarity, but in such fashion as will illustrate the principles involved. As is set forth in the above mentioned Kramer article, a d.c. current measuring instrument may be constructed utilizing the ideal or square-loop characteristic of certain ferromagnetic materials. A suitable core 11 is made of such material and the conductor 12 carrying the d.c. current to be measured is coupled thereto so as to saturate the core material. If an alternating voltage source 20 is connected to a suitable secondary winding 13, and to the load impedance 30 through a suitable rectifier 14, the secondary winding on alternate half periods of the source will draw magnetizing current opposing the saturating flux produced by the current in the conductor 12. Such magnetizing current will be essentially of rectangular wave form and of amplitude reflecting the amplitude of the primary current. If secondary windings and respective rectifiers are arranged in push-pull, the current passing through the load impedance will be an uninterrupted d.c. current proportional to the current flowing in the conductor 12. The device, then, acts as a current transformer of generally linear input-output relation. However, certain errors are inherent in its operation as noted by the above article, and various error compensation techniques have been suggested.

The above general description of FIG. 1 is based upon well known principles which have been used at least as early as 1936 (as noted by Kramer) to yield highly accurate d.c. current measurements. The present invention relates to the discovery that if the flux variation produced by the secondary winding as it draws magnetizing current is constrained to be constant for all measurements, a constant output error results. This error is then simply compensated by a fixed d.c. bias. Broadly, the manner in which constant flux variation is achieved according to the present invention is by a feedback technique in which the amplitude and/or frequency of the a.c. source 20 is controlled to vary the voltage-time product of its output such that the resultant flux variation in the core 11 remains constant irrespective of the amplitude of the d.c. current being measured. The transductor circuit may also comprise other components, such as transformers, impedances and impedance bridge circuits. The details of this circuit are not important to the invention and are not explained in further detail. What is important is that the load resistor 30 has flowing through it a load current obtained by rectification of the AC current flowing through the secondary winding 13 (irrespective of whether this is a single or multiple winding). The AC voltage source 20 together with the secondary winding 13, the rectifier 14 and the load resitor 30 forms a closed measuring circuit. The current component corresponding to the magnetising current flowing through the winding 13 is compensated by the load resistor 30 in conventional manner. The DC source 40 provides the DC current required for this purpose.

Where they relate to identical components in the system, the reference numerals used in the block diagram according to FIG. 1 are also used in the block diagrams shown in FIGS. 2 and 3. Where these components should be basically amended or supplemented according to the invention, the relevant reference numerals are followed by the prime sign.

In the embodiment shown in FIG. 2, the measuring transductor 10' is provided with an extra or separate secondary winding 15 connected to the input 51 of an integrator 50. The output 52 of the latter is connected to one input 61 of a comparator 60, the other input 62 of which is connected to a constant reference voltage source 70. The output 63 of the comparator is connected to the control input 21 of the AC voltage source 20', which is in this case controllable. The control circuit 15, 50, 60, 20' is closed via the output of the voltage source 20 connected to the secondary winding 13 of the measuring transductor 10'. Together with the integrator 50, the separate secondary winding 15 forms a pick-up member which provides a signal indicative of the flux variation occurring in the core 11 of the transductor 10'. Instead of a separate secondary winding 15, the existing secondary winding 13 or a part thereof may act as a part of the pickup member.

The voltage supplied to the input 51 of the integrator 50 can of course be picked off the measuring transductor 10' in any other suitable way.

The voltage induced in the transductor windings can be picked directly off the secondary winding 13 or the separate secondary winding 15. The output 52 of the integrator 50 delivers a voltage which is an accurate measure of the flux occurring.

When the voltage source 20' delivers a constant-frequency AC voltage, the flux is constant if the voltage through the winding 13 or 15 is constant. The integrator 50 may then be dispensed with. In FIG. 2 this is indicated by a broken line through the integrator.

The voltage at the output 52 of the integrator 50, i.e., the output voltage of the pick-up member formed by the winding 13 or 15 and the integrator 50, is compared in the comparator 60 with the reference voltage from the reference voltage source 70. The difference signal resulting at the output 63 of the comparator is fed as a control value or control voltage to the control input 22 of the AC voltage source 20'. The effect of the resulting closed control circuit is that the number of volt seconds determined by the reference voltage originating from the reference voltage source 70 is maintained.

The measuring error is thus independent of the AC voltage and of the load current. The fault current component, which is made constant, can now be compensated in the resistor 30 in a similar way to the prior art compensation of the magnetising current component in the load resistor 30. This gives a very close approximation to the ideal value of the current transformation of the measuring transductor.

The embodiment shown in FIG. 3 is intended exclusively for use in those cases in which a constant-frequency AC voltage is available. As already stated, the flux is then constant when the voltage through the winding 13 is constant. The voltage difference due to the current in the load resistor 30 is now used as a measure of the voltage losses occurring in the measuring circuit. The voltage through the resistor 30 is now fed to the control input 71 of the reference voltage source 70', which is in this case controllable, so that the source 70' delivers via output 72 to the input 64 of the comparator 60' a voltage which is composed of a constant reference component and a component proportional to the voltage across the load resistor 30. This component is a measure of the voltage loss. The feed voltage delivered by the controllable AC voltage source 20' at input 21 is fed to the other input 65 of the comparator 60'. The control loop is closed again via the output 66 of the comparator 60' and the control input 22 of the voltage source 20'. The control value in this case is the measuring loop loss voltage compared with a fixed reference value.

It will be apparent that the load current is stabilized in these conditions, so that the fault current component which is also made constant as a result can be compensated by the load 30 by means of a current originating from the current source 40. This gives the ideal value of the current transformation of the measuring transductor 10.

What we claim is:

1. In a device for measuring direct current flowing in a conductor, which device comprises: primary winding means for current conductive connection to said conductor; magnetic core means coupled with said primary winding means for establishing a first flux field in said core means which is proportional to the direct current flowing in said conductor; a measuring circuit comprising in series connection secondary winding means coupled with said core means, alternating voltage generator means, rectifying means and load impedance means for establishing in said core means a varying second flux field opposing said first flux field during at least part of the alternating voltage cycle; in combination:

flux variation detecting means for detecting the flux variation of said second flux field in said core means during said part of the alternating voltage cycle;

control means connecting said flux variation detecting means to said generator means for so varying the output of the latter as to maintain said flux variation at a constant value irrespective of the current flowing in said conductor; and d.c. bias means connected to said load impedance means for compensating fixed current error created by maintaining the variation of said second flux field at a constant value.

2. In a device for measuring direct current as defined in claim 1 wherein said control means includes a source of reference voltage and comparator means connected to said flux variation detecting means and to said source of reference voltage for controlling said generator means.

3. In a device for measuring direct current as defined in claim 2 wherein said flux variation detecting means comprises a pick-up winding coupled to said transformer core means.

4. In a device for measuring direct current as defined in claim 3 wherein said flux variation detecting means also includes an integrator connected in series with said pick-up winding.

5. In a device for measuring direct current as defined in claim 4 wherein said pick-up winding forms at least a part of said secondary winding means.

6. In a device for measuring direct current as defined in claim 4 wherein said pick-up winding is separate from said secondary winding means.

7. In a device for measuring direct current as defined in claim 1 wherein said flux variation detecting means comprises a pick-up winding coupled to said transformer core means.

8. In a device for measuring direct current as defined in claim 7 wherein said flux variation detecting means also includes an integrator connected in series with said pick-up winding.

9. In a device for measuring direct current as defined in claim 8 wherein said pick-up winding forms at least part of said secondary winding means.

10. In a device for measuring direct current as defined in claim 8 wherein said pick-up winding is separate from said secondary winding means.

11. A d.c. current transformer device for measuring the amplitude of d.c. current flowing in a conductor, comprising in combination:

transductor means having secondary d.c. output terminal means, said transductor means including transformer coil means of ferromagnetic material coupled with said conductor for receiving primary d.c. current input which creates a first flux field in said core means, secondary winding means coupled with said core means for creating a second flux field in said core means, alternating voltage generator means and rectifier means connected to said secondary winding means and to said output terminal means for causing said second flux field variably to oppose said first flux field at least during alternate half cycles of said generator means, and load impedance means connected to said output terminal means for carrying secondary d.c. current drawn by said secondary winding means in creating said second flux field, said alternating voltage generator means being controllable as to its voltage-time product output;

control means connecting said flux variation detecting means to said alternating voltage generator means for controlling the voltage-time product output of the latter to maintain the variation of said second flux field at a constant value irrespective of the amplitude of said primary d.c. current, whereby said secondary d.c. current is characterized by an error of fixed value; and d.c. bias means connected to said load impedance means for compensating said error of fixed value.

12. The method of measuring d.c. current flowing in a conductor, which comprises the steps of:

a. establishing a first flux field in a core of ferromagnetic material which first flux field is proportional to the current flowing in the conductor;

b. establishing a periodic pulsating second flux field in said core which opposes said first flux field;

c. controlling the pulsating flux field of step (b) so that its flux variation is of a fixed value irrespective of the strength of the first flux field whereby the magnetizing current necessary to establish said second flux field is characterized by an error offset of fixed value; and d. compensating for said error offset and measuring said compensated magnetizing current.

* * * * *

UNITED STATES PATENT OFFICE
CERTIFICATE OF CORRECTION

Patent No. 3,818,337      Dated June 18, 1974

Inventor(s) Maarten Groenenboom and Jacques Lisser

It is certified that error appears in the above-identified patent and that said Letters Patent are hereby corrected as shown below:

---Groenenboom et al.---

---[75] Inventors: Maarten Groenenboom, Escharen; Jacques Lisser, Nijmegen, both of Netherlands---.

Signed and sealed this 1st day of October 1974.

(SEAL)
Attest:

McCOY M. GIBSON JR.
Attesting Officer

C. MARSHALL DANN
Commissioner of Patents